United States Patent [19]

Lee

[11] 4,003,343
[45] Jan. 18, 1977

[54] METHOD AND APPARATUS FOR MAINTAINING THE OPERATING TEMPERATURE IN A DEVICE FOR REDUCING ENGINE EXHAUST POLLUTANTS

[75] Inventor: Roy C. Lee, Bartlesville, Okla.

[73] Assignee: Phillips Petroleum Company, Bartlesville, Okla.

[22] Filed: Apr. 4, 1975

[21] Appl. No.: 565,088

[52] U.S. Cl. .......................... 123/3; 123/DIG. 12; 123/1 A; 48/107; 48/212
[51] Int. Cl.² ........................................ F02C 43/08
[58] Field of Search .......... 123/119 E, 25 B, 25 D, 123/1 A, DIG. 12, 3; 48/102 A, 105, 107, 215, 212; 60/31, 39.02, 39.05, 39.06, 39.59, 39.53

[56] References Cited
UNITED STATES PATENTS

| | | | |
|---|---|---|---|
| 2,420,325 | 5/1947 | Nettel | 123/3 |
| 3,682,142 | 8/1972 | Newkirk | 123/3 |
| 3,717,129 | 2/1973 | Fox | 123/1 A |
| 3,915,125 | 10/1975 | Henkel et al. | 123/3 |

Primary Examiner—Charles J. Myhre
Assistant Examiner—William C. Anderson

[57] ABSTRACT

This invention provides a method and apparatus for maintaining the operating temperature in a device in which exhaust gases are passed from an engine through a fuel reformer in indirect heat exchange with fuel and steam in contact with a catalytic bed for steam reforming the fuel, the reformed fuel is brought into heat exchange relationship with the fuel and water entering the fuel reformer and thereafter the engine is operated utilizing this reformed fuel for lowering the amount of pollutant species from the engine. The method and apparatus for control is a combination of a means for sensing the temperature of the catalytic bed, and generating signals in response to a predetermined operating temperature for the catalytic bed whereby control valves are operated to admit additional fuel and a controlled flow of air or to stop the admission of air for mixing with the fuel and water entering the reforming means which provides a combustion mixture within the reforming means which on combustion raises the temperature within the reforming means. In one embodiment of the invention the heat of the engine block is utilized by indirect heat exchange with the fuel and water before entering the reforming means to vaporize the fuel and water thereby providing part of the heat necessary in the reforming of the fuel.

8 Claims, 1 Drawing Figure

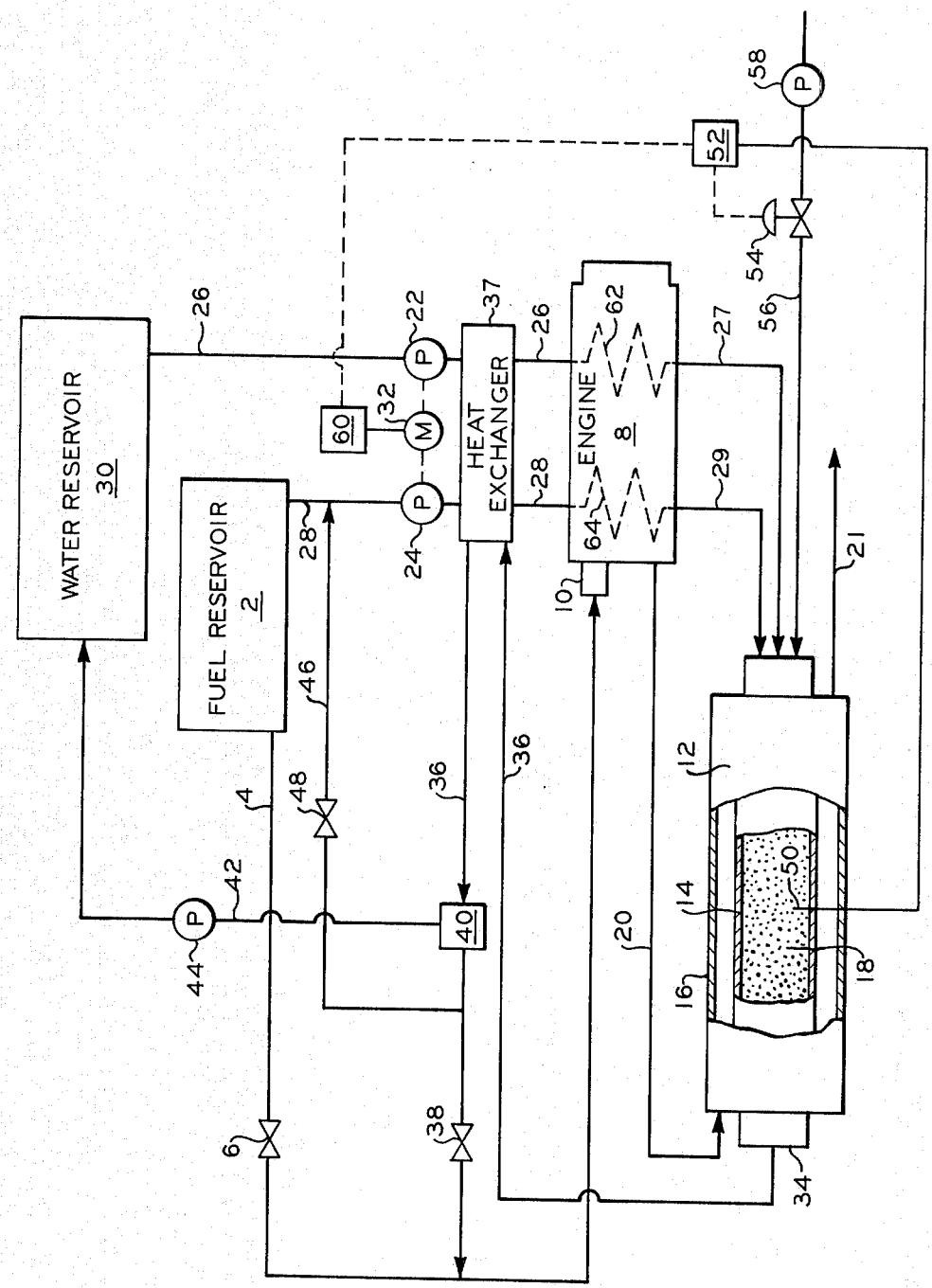

METHOD AND APPARATUS FOR MAINTAINING THE OPERATING TEMPERATURE IN A DEVICE FOR REDUCING ENGINE EXHAUST POLLUTANTS

BACKGROUND OF THE INVENTION

This invention relates to an apparatus and method for reducing pollutants discharging from the exhaust of an internal combustion engine. In one of its aspects this invention relates to controlling the temperature within a catalytic reforming bed to maintain an efficient operating temperature range for the reforming reaction. In another of its aspects this invention relates to the continuous efficient operation of an apparatus which reduces the pollutants discharging from the exhaust of an internal combustion engine even during periods of start-up and engine idling.

U.S. Pat. No. 3,717,129, incorporated herein by reference, sets forth an apparatus and method for passing hydrocarbon fuel for an engine and water through a catalytic bed, increasing the temperature of the water and fuel in contact with the catalytic bed by indirect heat exchange with exhaust gases from the engine, steam-reforming the fuel, and thereafter passing the reformed fuel to the engine for operating the engine with reduced pollutants in the exhaust of the engine. It has been found in operation by the method and apparatus of that patent that during periods of engine operation in which there is a low output of heat of combustion or in which the engine block is being warmed there can be insufficient heat generated to raise the temperature of the reforming catalyst bed to operating conditions and to maintain an efficient operating temperature level. The present invention provides an apparatus and method by which the efficient operating temperature of the reforming catalyst bed can be maintained. In one embodiment of the invention a method and apparatus is provided for utilizing heat generated in the engine block to provide preheating of the hydrocarbon fuel and water being fed into the catalytic bed thereby decreasing the amount of heat input to the catalytic bed by indirect heat exchange with the exhaust gases or by combustion within the catalytic bed to maintain an efficient operating temperature.

It is, therefore, an object of this invention to provide a method and apparatus for maintaining an efficient operating temperature in the catalytic reforming bed of an apparatus reforming a high energy fuel whch is thereafter used in operating an engine for reducing the amount of pollutant material in the exhaust discharging from said engine.

Other aspects, objects, and advantages of the present invention will become apparent from a study of the disclosure, the appended claims, and the drawing.

STATEMENT OF THE INVENTION

In accordance with this invention in an apparatus and method for passing hydrocarbon fuel for an engine and water to a catalytic bed, increasing the temperature of the water and fuel in contact with the catalytic bed in indirect heat exchange with exhaust gases from the engine, steam-reforming the fuel, and thereafter passing the reformed fuel to the engine for operating the engine with reduced pollutants in the exhaust of the engine, a method and apparatus is provided for sensing the temperature in the catalytic reforming chamber, generating a first signal in response as the temperature drops below a predetermined level and operating control valves responsive to the first signal to permit additional fuel and a controlled flow of air into the catalytic reforming chamber thereby providing a combustible mixture within the catalytic chamber which will ignite and provide heat of combustion within the catalytic chamber. Further providing method and apparatus by which a second signal is generated in response as the temperature rises above the predetermined level, the same as the first predetermined temperature, and controlling a valve in response to the second signal to prevent flow of air and additional fuel into the catalytic reforming chamber thereby stopping combustion of materials within the catalytic chamber.

In one embodiment of the invention means are also provided by which air is continuously moved and can be diverted by a control valve into the catalytic reforming chamber or movement of air can be initiated in response to the opening of a control valve to permit flow of air into the catalytic reforming chamber and the flow of air shut off in response to the closing of the control valve.

In another embodiment of the invention method and apparatus are provided for indirect heat exchange of the fuel and water with the engine block before entering the reforming chamber thereby utilizing the heat of the operating engine to provide at least a part of the heat necessary in the reforming of the fuel.

The operation of this invention can best be described in conjunction with the drawing which is a diagrammatic view of the control apparatus of this invention superimposed on an apparatus for reducing engine exhaust pollutants as set out in said U.S. Pat. No. 3,717,129. Although the invention will be described in relation to the apparatus particularly set out in this drawing it must be noted that the control method and apparatus set forth herein is applicable for adaptation to other, similar means for reducing engine exhaust pollutants.

Referring to the drawing the control system for maintaining an efficient operating temperature operates in conjunction with the device for reducing engine exhaust pollutants as described below. A stream of first hydrocarbon liquid fuel is discharged from a fuel reservoir 2 through a conduit 4 which can contain a shutoff valve 6 into a combustion chamber (not shown) of an engine 8 via a fuel injection apparatus 10.

A fuel regenerator tube 12 having first and second chambers 14, 16 extending through the tube with openings formed on the ends of the tube in communication with the chambers 14, 16 is associated with the exhaust of engine 8. A catalytic bed 18 is formed in the first chamber 14 of the fuel regenerator tube 12.

Exhaust from the engine 8 is conducted through conduit 20 which is connected from the combustion chamber of the engine to the second chamber 16 of the fuel regenerator tube 12 so that exhaust gases from the engine 8 can be passed through the second chamber 16 of the fuel regenerator tube 12 in indirect heat exchange with a catalytic bed 18 in the first chamber 14 of the fuel regenerator 12 and thence to the atmosphere through line 21.

Liquid proportioning means, which can be positive displacement gear pumps 22, 24, communicate through conduits 26, 28, respectively, with a water reservoir 30 and a liquid hydrocarbon fuel reservoir 2. The proportioning pumps are best operated by a common drive from motor 32. The pumps 22, 24 are adjusted for maintaining suitable proportions of water and hydrocarbons for the steam reform reaction. A weight ratio of water to hydrocarbon of about 1.2 or higher is ordinarily satisfactory as is pointed out in U.S. Pat. No. 3,717,129. The pumps 22, 24 discharge water and fuel into fuel regenerator tube 12, preferably at the end of the regenerator tube 12 that is opposed to the end of that tube into which the exhaust gases are discharged through line 20 so that countercurrent indirect heat exchange is maintained between the flow of material in first chamber 14 and the exhaust gases in second chamber 16. Reformed fuel is discharged from the fuel regenerator 12 preferably through a pressure regulator 34, and conduit 36 attached between the opposed end of the first chamber 14 and a valve 38 into the fuel line 4 before it enters the fuel injection apparatus 10 to be fed into the combustion chamber of engine 8.

Both by the process of this invention and the prior art the conduit 36 connecting the discharge end of the regenerator tube 12 and the fuel line 4 can be placed in indirect heat exchange relationship 37 with the discharge of the proportioning pumps 22, 24 to preheat the reactants for the steam reforming reaction within catalytic bed 18.

Condenser 40 can, optionally, be supplied in conduit 36 to condense at least a portion of the water in the reformate containing steam. This condensate can then be transferred by means of line 42 containing a pumping means 44 back to water reservoir 30.

Provision is also made in the apparatus of this invention for recycling of reformed hydrocarbon fuel from line 36 through line 46 to the suction of the hydrocarbon fuel proportion pump 24 for recycle of at least a part of the reformed product through the fuel regenerator tube 12. A controlling valve means 48 can be supplied in line 46 to control the amount of recycle to the pump suction.

This invention supplies additional apparatus to the system discussed above whereby a temperature sensing element 50 within the catalytic bed 18 senses the temperature of the catalytic bed and is connected to means 52 for generating a first signal in response to a sensed temperature of the catalytic bed below a predetermined temperature which signal is transmitted to a control valve 54 which responds to the first signal to admit air through line 56 into the same end of the first chamber 14 of the fuel regenerator tube 12 into which the discharge of proportioning pumps 22, 24 is admitted so that fuel, water, and air can be present in the catalytic bed 18 at the same time. A compressor or pump 58 is supplied in line 56 taking suction from the atmosphere to supply air. If desired, the air compressing means can be operated in response to the signal generated to open control valve 54 so that the compression means 58 is not required to run continuously.

Means 60 is also supplied to receive a signal transmitted from signal generating and transmitting means 52 by which the motor 32 on the proportioning pumps 22, 24 can be adjusted in speed to provide the fuel, and consequently a proportional amount of water, necessary for combustion with the air to generate the desired temperature range within catalytic bed 18.

Transmitter 52 is also capable of generating a signal in response to the attaining of a predetermined temperature sensed by element 50 to operate control valve 54 to shut off the flow of air into fuel regenerator tube 12, to proportionally slow down pump motor 32 and, optionally, shutting off air compressor 58.

In a further embodiment of the invention, the conduits 26, 28 which communicate between the displacement gear pumps providing water and fuel to the inlet of the catalytic reformer 12 are passed in indirect heat exchange 62, 64, with the block of the engine 8 and then passed through conduits 27, 29 into the catalytic reformer 12. This indirect heat exchange permits, when the engine is in operation, contact of the water and hydrocarbon fuel with a heat source which supplies energy to reduce the amount of heat that otherwise would necessarily have to be supplied in the catalytic reformer 12 itself. The heat energy from the engine block which would otherwise be lost to practical use is conserved. Note here that during the engine warm-up sufficient energy would not be available as heat in the engine block to supply the same amount of heat as when the engine was running in operating conditions.

It is well known in the art that the catalytic bed 18 can contain a catalyst suitable for steam reforming which is preferably formed of nickel or cobalt and can include other materials such as oxides of aluminum, chromium, cerium, zirconium, calcium, and the like. A particularly preferred catalyst is a calcium aluminate-nickel catalyst, containing about 20 weight percent nickel, which has been modified by incorporation of about 5 weight percent of a barium salt such as barium acetate. The catalytic bed 18 can also be formed of other materials known in the art as long as the catalytic bed will function at the temperatures of the particular exhaust system to steam reform the fuel supplied thereto and form a second fuel that will combust within the engine with the resultant exhaust gases having a lower volume of pollutant materials relative to exhaust gases of the fuel prior to regeneration in the apparatus used in this invention.

In the method for operating the apparatus used in this invention the temperature necessary for sufficient reforming of fuel in the catalytic bed depends on the type of catalyst and fuel and the volumes of the materials injected into the bed. The temperatures for different fuels and catalysts can easily be determined by one skilled in the art. In U.S. Pat. No. 3,717,129 a discussion of the thermodynamics involved in using an isooctane fuel for the reforming operation determined that the heat energy required to carry out a steam reforming reaction expressed as $C_8H_{18} + 8 H_2O \rightarrow 5.6 CO + 11.9 H_2 + 0.3 C_8H_{18} + 2.4 H_2O$ is about 275.1 kcal/mole of isooctane. To this must be added the heat energy necessary to vaporize and to heat both the isooctane and the water to 1,450° R, the temperature at which the equilibrium conversion of the hydrocarbon to reformer products is about 70 percent. The hydrocarbon conversion can be even higher depending upon specific catalysts and specific temperatures used, but this conversion was chosen to demonstrate the effectiveness of the invention. The total amount of heat energy required to carry out the reforming of isooctane which energy must be extracted from the exhaust gases or some other source is about 489 kcal/mole of isooctane.

The following example describes by the process of this invention the supplying of a constant amount of heat energy from the heated engine block which is used to vaporize the hydrocarbon fuel and water before it is fed to the reformer.

Using the heat from the engine block to vaporize the hydrocarbon fuel, for this example isooctane, and water reduces the amount of heat that the exhaust must supply to maintain the desired reformer temperature, here chosen as 1,450° R. Using the heat of vaporization of isooctane of 116.7 Btu/lb and the heat of vaporization of water at 212° F, one atmosphere, as 970 Btu/lb and a ratio of steam to hydrocarbon of 1.71 water/lb isooctane the heat required to vaporize water and isooctane is calculated to be 1775.4 Btu/pound of isooctane used as reformer feed (112.7 kcal/g-mole isooctane used as reformer feed). This is the heat required per g-mole of isooctane reformer feed to vaporize the isooctane and water. Subtracting this from the total heat required to carry out the reforming of isooctane, 485.9 kcal/g-mole isooctane, the heat necessary to raise the temperature of the vaporized water and isooctane feed for the reforming operation is 373.2 kcal/g-mole isooctane.

At a stoichiometric fuel/air ratio, the combustion of a typical internal combustion engine is about 4,200° R. At the end of the expansion stroke it is about 3,300° R and assuming a 300° drop for protection of the exhaust valve and valve seat, the useful exhaust temperature is about 3,000° R. Using this 3,000° R temperature as the inlet temperature of the exhaust gas to the reforming chamber and using 1,751° R as the temperature to which the exhaust stream is reduced after giving up heat in indirect heat exchange to the reforming chamber when 485.9 kcal of heat are extracted from the exhaust stream the heat capacity of the exhaust stream can be calculated. Using the heat capacity thus obtained, the temperature of the exhaust after supplying 373.2 kcal to the reformer from an inlet exhaust stream of 3,000° R is found to be 2,041° R. This temperature is substantially higher than the 1,450° R required for the reforming reaction and is considerably higher than the 1,751° R which would be the exhaust temperature from the reforming chamber if the heat of vaporization of the reforming reactant feed must also be contributed by heat exchange with the exhaust gas.

This example describes the process for maintaining the reformer at a specific operating temperature during low engine load conditions, such as startup or idling when the available heat energy from the exhaust gas is not sufficient to maintain the operating temperature at the desired level. The problem can be solved by adding air and some additional fuel to the reformer as the temperature of the reformer falls below a prescribed level. Combustion of the hydrocarbon fuel can supply the heat needed to maintain the reformer temperature at the desired level. Although the operating temperature will usually fall within a range of about 750° F to about 1,100° F, this example will use 950° F which was set out in U.S. Pat. No. 3,717,129 as the least temperature at which the catalytic bed should be held before fuel and water are injected therein.

The molal heat capacity of water has been calculated to be 0.510 Btu/lb water per °R. The heat capacity of isooctane vapor has been calculated to be 0.804 Btu/lb isooctane per °R. For steam/isooctane ratio of 1.71 lbs of water/lb isooctane, the heat capacity of the total reformer feed per pound of isooctane feed is calculated to be 1.676 Btu/lb isooctane reformer feed per °R or 106.4 kcal/g-mole isooctane reformer feed per °R. The heat energy produced by the combustion of non-reformed isooctane, as shown in the following equation
$C_8H_{18} + 12.5 (O_2 + 4N_2) \rightarrow 8 CO_2 + 9 H_2O + 50.0 N_2$
is about 1215.7 kcal/mole isooctane. Using these figures it can be seen that $8.7 \times 10^{-5}$ g-mole additional isooctane per g-mole isooctane reformer feed per °R is required to supply heat by conbustion to maintain the reformer feed at 950° F. From this can be calculated the amount of air for complete combustion of isooctane. The amount of air necessary is $5.2 \times 10^{-3}$ g-mole air added per g-mole isooctane reform feed per °R, thus, it can be seen that the amount of air and isooctane needed to maintain the reformer feed at 950° F is very small. It should be noted that the calculations above were based upon the assumption that no additional heat was required for the reforming reaction itself or for superheating the reformer feed.

Therefore, the amount of additional isooctane and air that would be required when the exhaust gas could not supply 373.2 kcal/g-mole isooctane reformer feed, i.e., when the heat for vaporization of the reactants is supplied by indirect heat exchange of the reactants with the heat of the engine block, is 0.31 g-mole isooctane per g-mole isooctane reformer feed and 18.5 g-mole air per g-mole isooctane reformer feed. The maximum amount of additional isooctane and air required when the exhaust gas could not supply 485.9 kcal/g-mole isooctane reformer feed, i.e., when there is no heat exchange between the reformer reactant feed and the heat in the engine block, is 0.40 g-mole isooctane per g-mole isooctane reformer feed and 23.8 g-mole air per g-mole isooctane reformer feed.

The automatic temperature control would start adding the additional isooctane and air as the temperature of the reformer falls below lower F. The lowr the temperature below 950° F, the more isooctane and air would be added. No isooctane or air would be added below a minimum practical control temperature of about 750° F at which the amount of added material becomes unwieldy.

I claim:
1. In a method for operating an engine with reduced pollutants in the exhaust of said engine in which water and a liquid hydrocarbon fuel for an engine are passed through a catalytic bed, increasing the temperature of the material in contact with the catalytic bed by indirect heat exchange with the exhaust from the engine, steam reforming the fuel, and thereafter passing the reformed fuel to the engine for operating the engine the improvement of
   1. passing water and liquid hydrocarbon fuel in indirect heat exchange with the block of the operating engine and then
   2. passing said water and hydrocarbon fuel through said catalytic bed.
2. In a method for operating an engine with reduced pollutants in the exhaust of said engine in which water and a liquid hydrocarbon fuel for an engine are passed through a catalytic bed, increasing the temperature of the material in contact with the catalytic bed by indirect heat exchange with the exhaust from the engine, steam reforming the fuel, and thereafter passing the reformed fuel to the engine for operating the engine the improvement of
   1. sensing the temperature in the catalytic reforming chamber;
   2. generating a first signal in response as the temperature drops below a predetermined level;
   3. operating the control for inlet of fuel to increase the amount of fuel into said catalyst reforming chamber; and
   4. operating a control valve responsive to said signal opening to permit a controlled flow of air into said catalyst reforming chamber.

3. The method of claim 2 wherein said flow of air is determined in amount by the degree of variance of the temperature below said predetermined level.

4. A method of claim 2 wherein the amount of air admitted into the reforming chamber is ratioed to the amount of additional fuel admitted into said catalyst reforming chamber in response to a temperature drop in the reforming chamber.

5. In a method according to claim 1 for operating an engine with reduced pollutants in the exhaust of said engine in which water and a liquid hydrocarbon fuel for an engine are passed through a catalytic bed, increasing the temperature of the material in contact with the catalytic bed by indirect heat exchange with the exhaust from the engine, steam reforming the fuel, and thereafter passing the reformed fuel to the engine for operating the engine the improvement of
   1. sensing the temperature in the catalytic reforming chamber;
   2. generating a first signal in response as the temperature drops below a predetermined level;
   3. operating the control for inlet of fuel to increase the amount of fuel into said catalyst reforming chamber; and
   4. operating a control valve responsive to said signal opening to permit a controlled flow of air into said catalyst reforming chamber.

6. In an apparatus for operating an engine with reduced pollutants in the exhaust of said engine in which water and a liquid hydrocarbon fuel for an engine are passed through a catalytic bed, increasing the temperature of the material in contact with the catalytic bed by indirect heat exchange with the exhaust from the engine, steam reforming the fuel, and thereafter passing the reformed fuel to the engine for operating the improvement comprising
   1. means for sensing the temperature in the catalyst reforming chamber;
   2. means for generating a first signal in response as the temperature drops below a predetermined level;
   3. means responsive to said signal for controlling the input of an additional amount of fuel into said reforming chamber;
   4. means in response to said signal for permitting a controlled flow of air into said catalyst reforming chamber.

7. In an apparatus according to claim 6 for operating an engine with reduced pollutants in the exhaust of said engine in which water and a liquid hydrocarbon fuel for an engine are passed through a catalyst bed, increasing the temperature of the material in contact with the catalytic bed by indirect heat exchange with the exhaust from the engine, steam reforming the fuel, and thereafter passing the reformed fuel to the engine for operating the engine the improvement comprising
   1. means for passing water and liquid hydrocarbon fuel in indirect heat exchange with the block of the operating engine prior to the inlet of said water and hydrocarbon fuel into the catalytic bed.

8. In an apparatus for operating an engine with reduced pollutants in the exhaust of said engine in which water and a liquid hydrocarbon fuel for an engine are passed through a catalytic bed, increasing the temperature of the material in contact with the catalytic bed by indirect heat exchange with the exhaust from the engine, steam reforming the fuel, and thereafter passing the reformed fuel to the engine for operating the engine the improvement comprising
   1. means for passing water and liquid hydrocarbon fuel in indirect heat exchange with the block of the operating engine prior to the inlet of said water and hydrocarbon fuel into the catalytic bed.

* * * * *

UNITED STATES PATENT AND TRADEMARK OFFICE
CERTIFICATE OF CORRECTION

PATENT NO. : 4,003,343
DATED : January 18, 1977
INVENTOR(S) : Roy C. Lee

It is certified that error appears in the above-identified patent and that said Letters Patent are hereby corrected as shown below:

Column 8, line 15, "catalyst" should be --- catalytic ---.

Signed and Sealed this

Twelfth Day of April 1977

[SEAL]

Attest:

RUTH C. MASON
*Attesting Officer*

C. MARSHALL DANN
*Commissioner of Patents and Trademarks*